United States Patent [19]

Jones

[11] Patent Number: 4,636,048
[45] Date of Patent: Jan. 13, 1987

[54] ADJUSTABLE EYEGLASS HOLDER FOR CAPS AND HATS

[76] Inventor: Boone Jones, P.O. Box 493, Ada, Okla. 74820

[21] Appl. No.: 671,252

[22] Filed: Nov. 13, 1984

[51] Int. Cl.⁴ .................................................. G02C 3/00
[52] U.S. Cl. ..................................... 351/155; 351/156
[58] Field of Search ............... 351/155, 140, 146, 130, 351/107, 156

[56] References Cited

U.S. PATENT DOCUMENTS

| | | |
|---|---|---|
| 671,252 | 4/1882 | Shone . |
| 862,795 | 8/1907 | Blackiston . |
| 1,118,719 | 11/1914 | Wirth ................................. 351/155 |
| 1,289,998 | 12/1918 | Yassukovitch . |
| 3,563,640 | 2/1971 | Wise et al. ........................... 351/155 |
| 4,152,051 | 5/1979 | Van Tiem et al. . |

Primary Examiner—Rodney B. Bovernick
Assistant Examiner—P. Dzierzynski
Attorney, Agent, or Firm—Norman B. Rainer

[57] ABSTRACT

An eyeglass holding apparatus is provided which enables a person to utilize eyeglasses without having the eyeglasses contact the nose or ears. The apparatus is comprised of a mounting band adapted to engage a hat or cap, holding arms, and telescopically adjustable components which facilitate easy assembly of the apparatus from mass-produced parts and adjustment to the needs and comfort of the wearer. The apparatus is preferably fabricated at least in part of moldable thermoplastic resin.

4 Claims, 3 Drawing Figures

ADJUSTABLE EYEGLASS HOLDER FOR CAPS AND HATS

BACKGROUND OF THE INVENTION

This invention relates to apparatus for positioning eyeglasses before the eyes of the wearer, and more particularly concerns eyeglass positioning apparatus which eliminates contact of the eyeglasses with the nose or ears of the wearer.

In the usual manner of wearing eyeglasses, the bows or arms of the frame usually rest upon the temples or ears, and the frame of the glasses rests upon the bridge of the nose. Such contact of the glasses with the nose, ears and skin behind the ears, especially on a prolonged basis, causes generalized discomfort, irritation and permanent indentation of the skin, and in some instances produces sores and pinched nerves.

Prior efforts to alleviate the aforementioned problems and provide comfortable eyeglasses have utilized various devices for suspending the eyeglasses from a cap or hat. Although effective in principle, such earlier devices have not permitted adequate adjustability to accommodate the various head dimensions and visual requirements encountered in the general population of eyeglass wearers. The limited adjustability of prior devices has been achieved with customized features of construction not amenable to mass production techniques.

It is accordingly an object of the present invention to provide apparatus for positioning eyeglasses before the eyes of the wearer without contacting the nose or ears of the wearer.

It is another object of this invention to provide apparatus as in the foregoing object adapted to be attached to a hat or cap.

It is a further object of the invention to provide apparatus of the aforesaid nature having features of adjustability to accommodate various head dimensions and visual requirements.

It is still another object of the present invention to provide apparatus of the aforesaid nature of lightweight and simple construction which may be economically manufactured.

These objects and other objects and advantages of the invention will be apparent from the following description.

SUMMARY OF THE INVENTION

The above and other beneficial objects and advantages are accomplished in accordance with the present invention by an eyeglass holding apparatus which comprises:

(a) a mounting band of adjustable size adapted to be attached to the interior headband of a cap or hat and substantially encircle the head of the wearer, said mounting band having a front extremity adapted to fit over the wearer's forehead, an opposed rear extremity, and a vertical plane of symmetry that bisects said front and rear extremities, (b) first and second elongated straight rigid holding arms forwardly extending from the front extremity of said mounting band in equally spaced relationship about said vertical plane of symmetry and centered in a plane that perpendicularly intersects said plane of symmetry, (c) a first T-shaped sleeve comprised of a straight hollow top portion and straight hollow leg portion, said top portion being slideably engaged by said first holding arm, the leg portion being directed toward the opposite holding arm, (d) a second T-shaped sleeve comprised of a straight hollow top portion slideably engaged by said second holding arm, and a straight leg portion which telescopically inserts within the leg portion of said first sleeve, thereby forming a structural bridge between said holding arms, (e) a third T-shaped sleeve comprised of a straight hollow top portion slideably engaged by the straight leg portion of said first sleeve and adapted to move horizontally along said structural bridge, and a straight leg portion downwardly oriented with respect to said structural bridge, (f) vertical adjustment means adapted to telescopically engage the downwardly oriented leg portion of said third sleeve, said adjustment means being of elongated straight construction, (g) the several slideably and telescopically interengaged members being interactive in a manner to remain in a selected position until forcibly re-positioned, (h) attachment means positioned adjacent the lowermost extremity of said adjustment means for holding eyeglasses, and (i) eyeglasses having a frame with nosepiece but devoid of arms intended to engage the ears of the wearer, said eyeglasses being supported adjacent said nosepiece by said attachment means in a disposition below said structural bridge and substantially coplanar therewith.

In preferred embodiments of the invention, most of the component parts are fabricated of durable rigid lightweight plastic material.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

Figure 3:
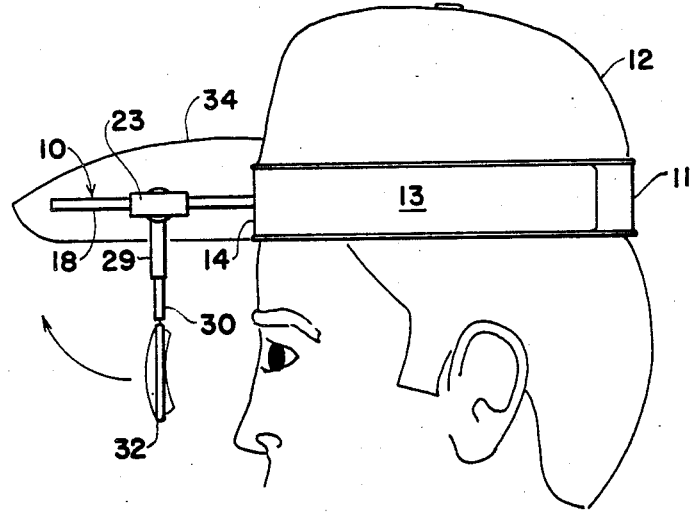
FIG. 3 is a side view of the apparatus of FIG. 1 shown associated with a cap seated upon a wearer's head.

For convenience in description, the terms "front" and "rear", or words of similar import, will have reference to the left and right extremities, respectively, of the apparatus appearing in FIG. 3. Similarly, the expressions "upper" and "lower", and equivalents, will have reference to the upper and lower extremities, respectively, of the apparatus shown in FIG. 3.

DESCRIPTION OF THE PREFERRED EMBODIMENT

Figure 1:
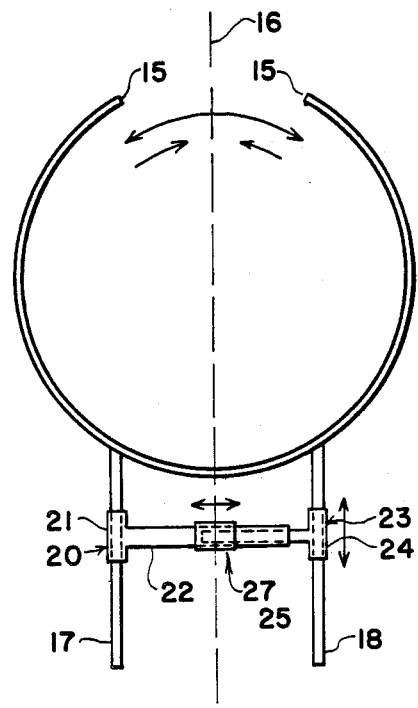
FIG. 1 is a top view of an embodiment of the apparatus of the present invention.
Figure 2:
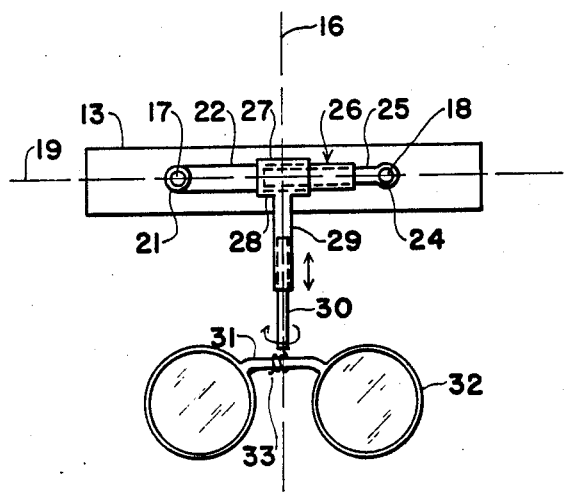
FIG. 2 is a front view of the apparatus illustrated in FIG. 1.

Referring to the drawing, an embodiment of the apparatus 10 of this invention is shown attached to the interior head liner 11 of cap 12 by means of mounting band 13 fabricated of a plastic composition and having a U-shaped contour adapted to substantially encircle the head of the wearer. Said mounting band is comprised of front extremity 14 adapted to fit over the wearer's forehead, and bifurcated open rear extremity 15. The mounting band is further characterized in having a vertical plane of symmetry, represented by dashed line 16 in FIGS. 1 and 2, which bisects said front and rear extremities.

The mounting band is adapted to engage the head liner of a cap or hat in a manner permitting sliding horizontal movement while preventing vertical movement. The apparatus is preferably used with a cap having a head liner of adjustable size.

First and second identical elongated straight rigid holding arms 17 and 18, respectively, extend forwardly and substantially horizontally from the front extremity of said mounting band. Said holding arms are equally spaced about plane of symmetry 16 and are centered in a horizontal plane, represented by the dashed line 19 in FIG. 2, which perpendicularly intersects plane 16. The holding arms have a constant cross-sectional configuration throughout their length, said length being preferably between about 2 to 4 inches. Said cross-sectional configuration, taken in planes perpendicular to the axis of elongation, is preferably circular. In the illustrated embodiment, holding arms 17 and 18 are continuous integral extensions of mounting band 13, the combined mounting band and holding arms having been made by injection molding from a resilient, non-brittle thermoplastic resin such as nylon, polyacetal, polyester, polyolefin, butadiene interpolymers, and the like.

First T-shaped sleeve 20 is comprised of straight hollow top portion 21 in slideable engagement with holding arm 17, and straight hollow leg portion 22 perpendicularly attached to said top portion and directed toward holding arm 18.

Second T-shaped sleeve 23 is comprised of straight hollow top portion 24 in slideable engagement with holding arm 18, and straight leg portion 25 which insertively engages hollow leg portion 22 of sleeve 20. In other embodiments, leg portion 22 may insert within leg portion 25. It is necessary, however, that at least one of said leg portions is hollow and the other adapted to fit telescopically therein. The interengagement of leg portions 22 and 25 establishes a structural bridge 26 horizontally disposed between said holding arms and perpendicular thereto.

Third T-shaped sleeve 27 is comprised of straight hollow top portion 28 in slideable engagement with leg portion 22 of sleeve 20, and straight hollow leg portion 29 downwardly directed from said structural bridge.

Vertical adjustment means in the form of elongated straight rod 30 is adapted to insertively and telescopically engage downwardly directed leg portion 29. In alternative equivalent embodiments, however, the vertical adjustment means may be hollow and leg portion 29 may slideably insert therein.

Attachment means in the form of a length of easily bendable fine wire 31 is associated with the lowermost extremity of rod 30, said attachment means being adapted to hold eyeglasses 32 at the nosepiece 33 thereof.

The several components of the apparatus of this invention are preferably fabricated of non-brittle resilient thermoplastic resins of the aforementioned nature. Where slideable interengagement of components is specified, said engagement is sufficiently tight so that forceful manipulation is required to re-adjust positioning of components.

By virtue of the design and construction of the apparatus of this invention, the following modes of adjustability are presented:
(a) adjustment to the head size of the wearer by enlarging or contracting the general diameter of the mounting band, said adjustment being achievable in the case of thermoplastic mounting bands by warming the mounting band, making the adjustment, then cooling to ambient temperature,
(b) horizontal adjustment along said structural bridge,
(c) adjustment of the distance of the eyeglasses from the mounting band along said holding arms,
(d) adjustment of the distance of the eyeglasses below said holding arms, and
(e) pivotal movement of the eyeglasses about said structural bridge, thereby permitting the eyeglasses to be conveniently placed in an upraised non-use or storage position beneath brim 34 of cap 12.

Said modes of adjustability are generally indicated by double-arrow lines in the drawing.

To more readily accommodate all head sizes, the apparatus may be fabricated in three sizes such as small, medium and large. Exact adjustment of the apparatus within a given size group can be readily accomplished by the individual wearer.

The purpose of the telescoping connection between rod 25 and tube 22 is to facilitate assembly of the apparatus from its component parts. Because of such easy assembly capability, the apparatus of this invention can be made from mass-produced parts. Otherwise, each unit would have to be custom-made and custom-fitted.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An eyeglass holding apparatus which comprises:
(a) a mounting band of adjustable size adapted to be attached to the interior headband of a cap or hat and substantially encircle the head of the wearer, said mounting band having a front extremity adapted to fit over the wearer's forehead, an opposed rear extremity, and a vertical plane of symmetry that bisects said front and rear extremities,
(b) first and second elongated straight rigid holding arms forwardly extending from the front extremity of said mounting band in equally spaced relationship about said vertical plane of symmetry and centered in a plane that perpendicularly intersects said plane of symmetry,
(c) a first T-shaped sleeve comprised of a straight hollow top portion and straight hollow leg portion, said top portion being slideably engaged by said first holding arm, the leg portion being directed toward the opposite holding arm,
(d) a second T-shaped sleeve comprised of a straight hollow top portion slideably engaged by said second holding arm, and a straight leg portion which telescopically inserts within the leg portion of said first sleeve, thereby forming a structural bridge between said holding arms,
(e) a third T-shaped sleeve comprised of a straight hollow top portion slideably engaged by the straight leg portion of said first sleeve and adapted to move horizontally along said structural bridge, and a straight leg portion downwardly oriented with respect to said structural bridge, (f) vertical adjustment means adapted to telescopically engage the downwardly oriented leg portion of said third sleeve, said adjustment means being of elongated straight construction, (g) the several slideably and telescopically interengaged members being interactive in a manner to remain in a selected position until forcibly re-positioned, (h) attachment means positioned adjacent the lowermost extremity of said adjustment means for holding eyeglasses, and (i) eyeglasses having a frame with nosepiece but devoid of arms intended to engage the ears of the wearer, said eyeglasses being supported adjacent said nosepiece by said attachment means in a disposition below said structural bridge and substantially coplanar therewith.

2. The apparatus of claim 1 wherein said holding arms are continuous integral extensions of said mounting band.

3. The apparatus of claim 1 fabricated at least in part of moldable thermoplastic resins.

4. The apparatus of claim 1 which facilitates the following adjustments:
  (a) head size of the mounting band,
  (b) horizontal position of the eyeglasses,
  (c) distance of the eyeglasses from the mounting band,
  (d) distance of the eyeglasses below said holding arms, and
  (e) pivotal movement of the eyeglasses about said structural bridge to an upraised storage position.

* * * * *